United States Patent [19]

Bricko et al.

[11] Patent Number: 5,623,817
[45] Date of Patent: Apr. 29, 1997

[54] OPERATING UNIT JOINT FOR TURF MAINTENANCE EQUIPMENT

[75] Inventors: Thomas K. Bricko, Lakeville; Joseph P. Hager, Burnsville; Daniel G. Stiller, Savage, all of Minn.

[73] Assignee: The Toro Company, Bloomington, Minn.

[21] Appl. No.: 376,333

[22] Filed: Jan. 20, 1995

[51] Int. Cl.$^6$ ............................................. A01D 34/62
[52] U.S. Cl. ............................. 56/7; 56/249; 56/294
[58] Field of Search ............................ 56/7, 249, 294, 56/249.5, DIG. 20

[56] References Cited

U.S. PATENT DOCUMENTS

| | | | |
|---|---|---|---|
| 2,099,902 | 11/1937 | Moyer et al. | 56/7 |
| 3,058,281 | 10/1962 | Lewis | 56/7 |
| 3,514,926 | 6/1970 | Heth et al. | 56/7 |
| 4,021,996 | 5/1977 | Bartlett et al. | 56/7 |
| 4,161,858 | 7/1979 | Gerrits | 56/7 |
| 4,769,976 | 9/1988 | Bassett et al. | 56/7 |
| 4,854,112 | 8/1989 | Holley et al. | 56/6 |
| 5,042,236 | 8/1991 | Lamusga et al. | 56/7 |
| 5,343,680 | 9/1994 | Reichen et al. | 56/249 |
| 5,459,984 | 10/1995 | Reichen et al. | 56/7 |

FOREIGN PATENT DOCUMENTS 39213  11/1981  European Pat. Off. ....... A01D 75/30

OTHER PUBLICATIONS 3215 and 3235 Turf System I & II, operator's manual, copyright 1994, pp. 70–75.

*Primary Examiner*—Terry Lee Melius
*Attorney, Agent, or Firm*—R. Lawrence Buckley

[57] ABSTRACT

A steering operating unit joint (22) for connecting an operating unit (20) to a lift arm (18) of a turf maintenance machine (10). Operating unit (20) can be a reel-type turf cutting unit. Cutting unit joint (22) preferably includes a pivot knuckle (50) having a snout (66), suitably secured to the free end of lift arm (18); and a snout receiver (94) suitably secured to cutting unit (20). A pair of resilient elements (100) is interposed between snout (66) and snout receiver (94). Elements (100) act between snout (66) and snout receiver (94) to resist "yawing" of cutting unit (20), whereby cutting unit (20) can be automatically straightened once it is raised to its transport position. During transport, cutting unit (20) is maintained in a straight and level orientation so that the turf is not gouged when the cutting unit (20) is lowered to its operating position "on the fly."

23 Claims, 5 Drawing Sheets

OPERATING UNIT JOINT FOR TURF MAINTENANCE EQUIPMENT

TECHNICAL FIELD

The invention relates generally to turf maintenance equipment, and more particularly to a method and apparatus for mounting an operating unit (e.g., a cutting reel unit) to a traction vehicle.

BACKGROUND OF THE INVENTION

Many types of turf maintenance equipment are known. One very common type, and the one to which the present invention most directly applies, is turf mowing equipment. Such equipment can generally be classified into those mowers which include a rotary cutting unit(s) and those which include a reel cutting unit(s). A rotary cutting unit usually includes one or more rigid, generally straight, steel blades rotated within a housing about a vertical axis to sever grass or other vegetation at a predetermined height above the ground. A reel cutting unit, on the other hand, typically includes a frame within which is horizontally rotatably mounted a reel possessing a plurality of arcuate blades. The rotating reel blades pass in close proximity to a bedknife which spans the cutting unit frame parallel to the horizontal reel axis. Grass blades are sheared at the reel blade/bedknife interface.

While rotary cutting units are suitable for many purposes, it is generally perceived that reel units provide a higher quality cut. The present invention relates primarily to turf reel mowers, and the remainder of this discussion will focus on same. As is well known, another reel-like unit is used to produce a "verticut," and this type of cutting unit is also contemplated.

Power turf mowing equipment can also be categorized based on the method of propelling the cutting units. Generally, there are walk-behind, riding, and towed turf mowers. The present invention relates primarily though not exclusively to riding turf mowers, and for the sake of brevity the invention will hereafter be discussed in terms of commercial riding mowers having one or more reel cutting units.

Riding reel-type turf mowers typically include a traction vehicle supported by a plurality of wheels, including one or more traction wheels; a prime mover supported by the vehicle frame and connected through a transmission to the traction wheel(s); and one or more reel-type cutting units, powered by the prime mover through belts or hydraulic motors, mounted to the traction vehicle in some fashion. The present invention relates in particular to the technique by which the reel units are mounted to the traction vehicle.

The cutting unit connection technique is critically important and depends on the intended applications and capabilities of the mower. Riding reel-type mowers intended for use on golf courses, for example, typically employ a cutting unit connection technique that provides two basic positions for the cutting unit(s): a lowered "operating position" and a raised "transport position". The cutting units engage the turf and mow in their operating position, whereas the cutting units are out of engagement with the turf and are not mowing in their transport position. A transport position allows the operator to temporarily raise one or more of the cutting units to mow a narrower swath or to pass through a gate or between trees. Also, it is occasionally necessary to drive the mowing machines over conventional road surfaces, at which time it is important to raise the cutting units to a transport position since they are typically not designed for repeatedly running up and down over curbs, nor for travel over paved streets. But probably the most pressing reason for a transport position is so that the vehicle can move relatively rapidly from one particular work area to another at a given site. For example, someone mowing the fairways of a golf course would have to rapidly move from one fairway to another, with the cutting units in their transport positions. Once the unmowed fairway is reached, the operator typically lowers the cutting units from their transport positions to their operating positions on the fly, i.e. with the traction vehicle moving forward. Preferably the turf is not gouged or in any way damaged when this "on the fly" transition occurs. Prior art cutting unit connection techniques often caused the reel units, as they were being lowered to their operating positions, to contact the ground in a tilted or skewed state (as shown in FIG. 4A, for example), thus gouging or at least scuffing the turf. Such a result is highly undesirable, especially on a golf course where the condition of the turf is of the utmost importance.

Riding reel-type mowers typically include so-called "lift arms" which support the cutting units in both positions ("operating" and "transport") and which raise and lower the reel units from one position to another. A lift arm is interposed between the traction vehicle and each cutting unit, and is typically an elongate (though not necessarily straight) element having a first end pivotally connected to the traction vehicle and a second end coupled to the cutting unit by means of some sort of joint, hereinafter termed an "operating unit joint" or a "cutting unit joint." The lift arm/traction vehicle joint, at the first end of the lift arm, is typically though not necessarily a simple pivot joint permitting only one "degree of freedom" relative to the traction vehicle, and this joint is hereinafter termed a "lift arm joint." The pivot is typically about a substantially horizontal axis. The cutting unit joint between the lift arm and the cutting unit is oftentimes more involved, depending on the objectives being sought. The present invention is particularly directed to an improved cutting unit joint for a reel-type mower of the type generally described above.

One important capability of reel-type riding mowers, particularly those for use on golf courses, is to be able to cut the turf with great precision. That is, the height of cut must be extremely consistent across the entire width of the mower, regardless of the terrain. This requires that the cutting unit(s) "float" relative to the traction vehicle. A truly free-floating reel unit can follow the contours or undulations of the ground irrespective of the relatively gross motion of the traction vehicle. If reel units are not supported in a floating manner, they tend to scalp the higher regions and skip over the lower regions.

The lift arm joint typically allows for one "degree of freedom" of the cutting unit: if the cutting unit needs to move up or down, relative to the traction vehicle, to follow turf undulations, the lift arm pivots on the traction vehicle to permit this to happen. But it is the cutting unit joint, the joint between the lift arm and the cutting unit, that is usually called upon to provide most of the flexibility needed to accommodate a more or less free-floating cutting unit. That is, the cutting unit joint typically provides for the other degrees of freedom often associated with a high precision floating cutting unit of the type used on golf courses and similarly demanding locations. These other degrees of freedom can include "rolling" (pivoting side to side about a longitudinal axis); "yawing" (pivoting about a vertical axis); and "pitching" (pivoting about a lateral axis), to make use of aviation terms to describe various motions of a reel-type cutting unit as it follows the turf.

One commonly desired characteristic of a cutting unit joint is to permit limited "steering" of the associated cutting unit, steering being but one type of "floating" as discussed above. A cutting unit is said to "steer" when it yaws (to again borrow an aviation term) about a vertical axis formed by the cutting unit joint so as to minimize skidding of the cutting unit as the mower traverses a turn. This steering action is typically achieved by making the cutting unit joint in the general nature of a caster wheel joint, so that steering or castering occurs automatically during a turn without having to actively force the cutting unit to yaw with a force producing element such as a hydraulic cylinder.

If the cutting units are not permitted to steer, then the rollers supporting the cutting unit will tend to slide laterally, i.e. skid, to some degree when the mower negotiates a turn. If a so-called Wiehle roller, one which includes a plurality of circumferential grooves along its entire length, is used in conjunction with a non-steering cutting unit, then skidding and turf scuffing is even more likely. And a cutting unit which is sliding laterally even slightly does not provide as clean a cut as a cutting unit which is accurately tracking the turn, i.e. aligned such that an axis passing through the cutting reel is perpendicular to the direction of travel of the traction vehicle at any given instant in time.

Thus for many mower applications it is advantageous to have a cutting unit joint, between the lift arm and the cutting unit, which provides limited steering. But a steering cutting unit joint can create problems as well. For example, a steering cutting unit joint can make the cutting unit overly "floppy" when it is in its raised transport position. This can create unnecessary noise (and wear) as the cutting unit bangs against mechanical "stops" which establish maximum angular limits to the steering or yaw. This banging might even cause the cutting unit to lose its height of cut adjustment over a period of time, a significant problem especially for users who do not check their height of cut setting on a regular basis. And a steering cutting unit joint can also contribute to the phenomenon depicted in FIG. 4A. This drawing shows a front elevational view of a cutting unit which is tipped to one side which, if lowered to the turf "on the fly," would cause damage to the turf. The lowermost corner of the cutting unit would be the first thing to engage the turf, and this corner would dig into the turf. A steering cutting unit joint can contribute to this phenomenon in the following way: especially in the context of a cutting unit joint which permits side-to-side tipping, or "rolling" (again borrowing an aviation term), of the cutting unit, a steering-type cutting unit which is yawed completely over against one of the stops can become imbalanced and then tip or "roll" to the position shown in FIG. 4A. Once the cutting unit is in this tipped state, lowering the cutting unit "on the fly" (from the transport position to the operating position) can definitely cause damage to the turf.

The present invention addresses the problems possessed by prior art cutting unit joints. In particular, the present invention includes a cutting unit joint which can accommodate controlled steering and even "rolling" in a preferred embodiment, but which also decreases the likelihood of a tipped cutting unit (as shown in FIG. 4A) and thereby reduces turf damage. A preferred cutting unit joint according to the present invention can permit "floating" of the reel unit; accommodate existing reel unit lifting techniques; and reduce turf damage during "on the fly" transport-to-operating position transitions.

SUMMARY OF THE INVENTION

Accordingly, in broad terms the invention is directed to a turf maintenance machine including a traction unit; a turf maintenance operating unit (such as a cutting reel unit); a lift arm operatively connected to the traction unit; and a unique steering operating unit joint connecting the turf maintenance operating unit to the lift arm, wherein the steering operating unit joint permits the turf maintenance operating unit to steer and includes a resilient component which urges the turf maintenance operating unit toward a predetermined normal operating position, in terms of the degree of yaw of the turf maintenance operating unit relative to the lift arm.

In a preferred embodiment, the lift arm includes a lateral portion proximate the first end thereof and a longitudinal portion proximate the second end thereof. In this embodiment, there can be a "snout" connected to and extending forwardly of the lift arm longitudinal portion, and a "snout receiver" connected to the turf maintenance operating unit and opening rearwardly to receive the snout. The resilient component, in this embodiment, is located between and urges against the snout and the snout receiver.

The resilient component can include a first resilient element bearing against a first side of the snout and a second resilient element bearing against a second side of the snout. A turf maintenance machine can thus be constructed such that the snout receiver has first and second sides proximate the first and second sides of the snout, wherein the resilient elements are generally triangularly shaped pieces of elastomeric material, and wherein the base of each of the elastomeric elements is secured to one of the snout receiver sides and extends toward the corresponding snout side.

The turf maintenance operating unit referred to above can be a mowing unit, and is preferably a reel-type turf cutting unit.

The steering cutting unit joint of the present invention can permit "rolling" of the cutting unit relative to the lift arm.

Preferably, the yaw resisting force produced by the resilient component is insufficient to materially hinder yawing of the turf maintenance operating unit when it is in its operating position; but the yaw resisting force causes the turf maintenance operating unit to return to its normal or straight position once the turf maintenance operating unit is raised to its transport position.

Finally, a preferred embodiment would include a steering pin which can be selectively positioned within first and second aperture sets established by the snout and snout receiving means, wherein when the steering pin is positioned within the first set of apertures, steering is prevented, and wherein when the steering pin is positioned in the second set of steering pin apertures controlled steering is permitted.

Additional features of the invention are described herein.

BRIEF DESCRIPTION OF THE DRAWINGS

The invention will be further described with reference to the Drawings, wherein.

DETAILED DESCRIPTION OF THE INVENTION

Figure 1:
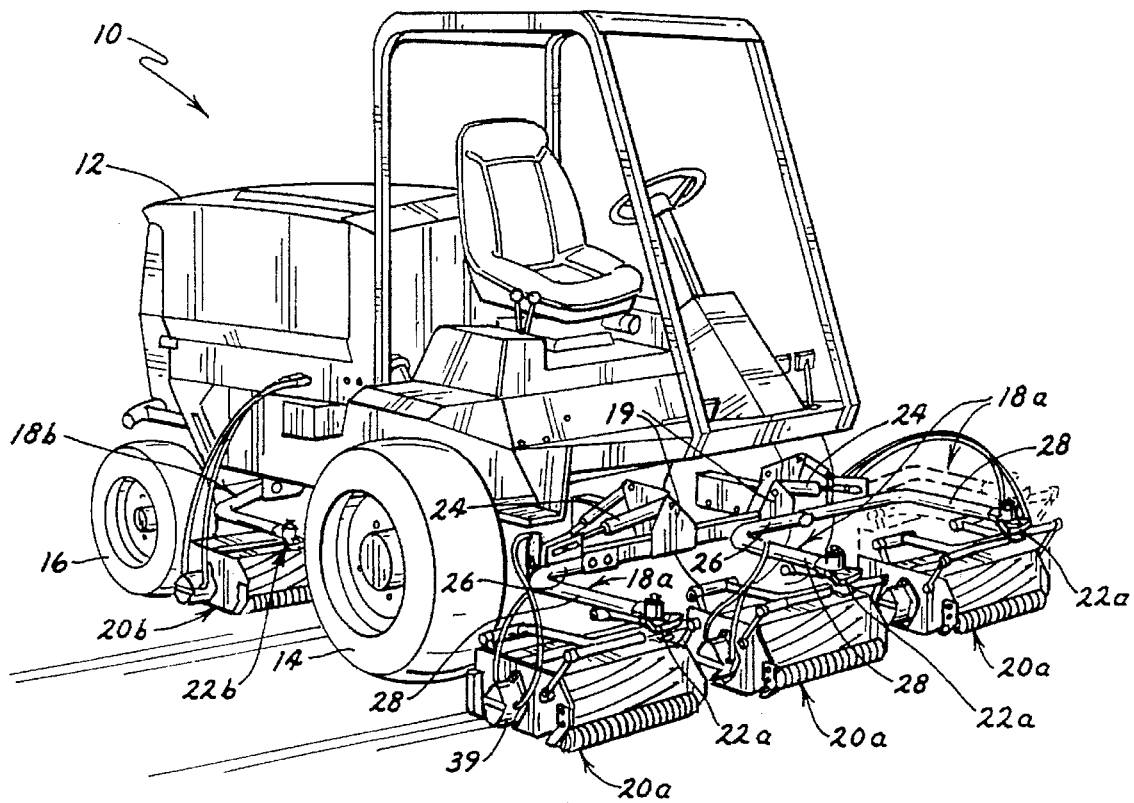
FIG. 1 is a perspective view of a turf maintenance machine according to the invention.

Referring to the Drawings, wherein like reference numerals designate like parts and assemblies throughout the several views, FIG. 1 shows a perspective view of a preferred turf maintenance machine 10 according to the invention. Machine 10 is preferably a reel-type turf mower generally of the type represented by the Reelmaster® 5300 mower sold by The Toro Company, assignee herein; but those skilled in the art will appreciate that the present invention could be applied to other types of turf maintenance equipment. Mower 10 includes a traction vehicle 12 supported by a pair of front drive wheels 14 appropriately coupled through a transmission (not shown) to a prime mover (also not shown). A pair of rear steerable wheels 16 support the rearward end of vehicle 12.

Turf maintenance machine 10 can be used in a variety of turf maintenance capacities, e.g., mowing and dethatching. Hydraulically-powered tools are operatively connected to vehicle 12 for these purposes. A plurality of front tool-supporting lift arms 18a are pivotally connected to the front central portion of a frame 19 of vehicle 12. Similarly, a plurality of rear tool-supporting lift arms 18b are pivotally connected to the frame 19 of vehicle 12 proximate to its longitudinal mid-point. The front lift arms 18a are, in a preferred embodiment, actually pivotally coupled to a sub-frame sometimes called the tractor carrier frame. The rear lift arms 18b, by contrast, attach directly to the frame of traction vehicle 12, with similar pivot joints. The tractor carrier frame mainly facilitates manufactureability, and certainly all of the lift arms 18 could be attached directly to the main frame of the traction vehicle 12.

A front reel unit 20a is coupled to each front lift arm 18a through a unique cutting unit joint 22a which permits reel units 20a to selectively steer or yaw, as further described below. A rear reel unit 20b is coupled to each rear lift arm 18b, through the use of a cutting unit joint 22b which is preferably substantially identical to cutting unit joint 22a. The present invention is particularly directed to the cutting unit joints 22, and they will be described in some detail below.

In the preferred embodiment, there are three front cutting units 20a spaced along a line generally perpendicular to a fore-and-aft or longitudinal axis 23 of mower 10 and directly in front of the drive wheels 14; and two rear cutting units 20b roughly centered between vehicle wheels 14 and 16 and also arranged along a line which is generally perpendicular to the longitudinal axis 23 of the mower. As known by those skilled in the art, the rear cutting units 20b overlap the front cutting units 20a to handle the uncut strips of grass between the front cutting units.

In the preferred embodiment, the front and rear cutting units 20 and related support structures are substantially identical in all pertinent respects, and therefor the "a" and "b" suffixes will not hereafter be used in most instances. In fact, in a preferred embodiment the front and rear cutting units are completely interchangeable.

Figure 2:
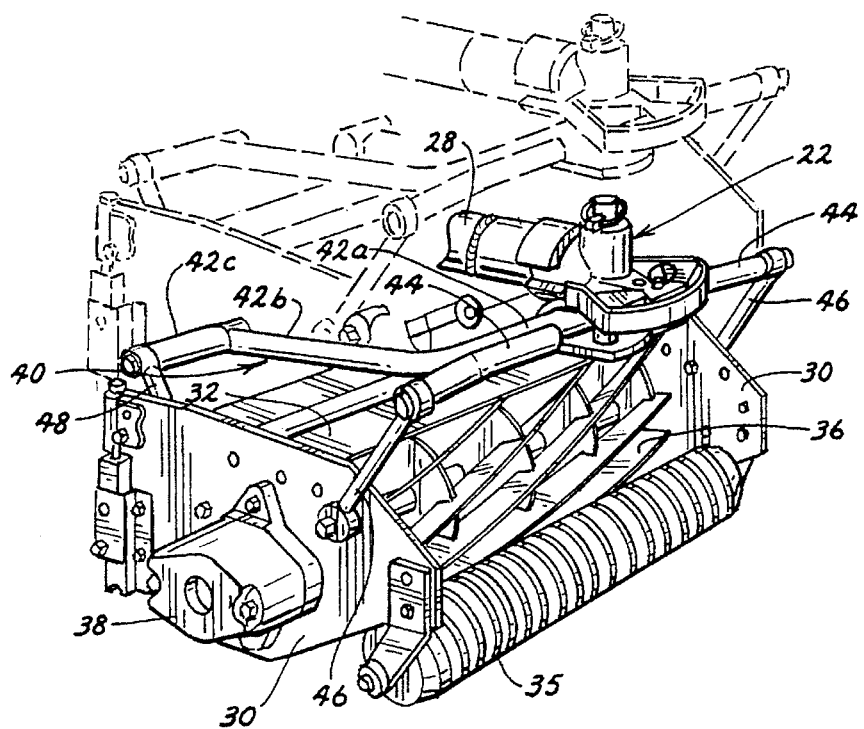
FIG. 2 is an enlarged perspective view of a reel unit connected to a lift arm using a steering cutting unit joint in accordance with the invention.

Each cutting unit 20 can be raised from a normal operating position, as shown in solid line in FIGS. 1 and 2, to a transport position wherein the cutting unit 20 is up out of engagement with the turf, as shown in phantom line in FIGS. 1 and 2. Paired with each cutting unit 20 is a hydraulic lift cylinder 24, selectively operable by the operator. Each lift cylinder 24 is arranged such that its cylinder is pivotally secured to vehicle frame 19, and its piston or rod is similarly secured to the corresponding lift arm 18. Each hydraulic lift cylinder 24 is capable of lifting its associated reel unit 20 from the operating position to the transport position. Reel units 20 are for the most part shown in their operating positions in the Drawings, but those skilled in the art will recognize that the reel units can be selectively raised for transportation purposes and to permit the operator to mow a narrower swath or to relatively rapidly move to a different work area, for example.

Each lift arm 18 is preferably constructed from 2.25 inch O.D., 0.188 inch wall thickness, steel tube, and can include a lateral portion 26 suitably connected to frame 19 and a longitudinal portion 28 generally perpendicular thereto. The lateral portion 26 of each lift arm 18 can be contained within a vertical plane which is generally perpendicular to a vertical plane containing mower longitudinal axis 23. The longitudinal portion 28 of each lift arm 18 is generally parallel to the longitudinal axis 23 of mower 10. The free end of each lift arm longitudinal portion 28 carries the associated cutting unit joint 22 which in turn carries the corresponding cutting unit 20. The present invention is particularly directed to the cutting unit joint 22, and a preferred such joint 22 will be further described below in some detail.

An enlarged perspective view of the left (as viewed by the operator) front reel unit 20, a part of the longitudinal portion 28 of its associated lift arm 18, and the preferred cutting unit joint 22 are shown in FIG. 2. Again, the operating position of reel unit 20 is shown in solid line whereas the transport position is shown in phantom line. Although the particular construction of reel unit 20 is not central to the invention, the basic components of reel unit 20 will be described. A pair of generally rectangular side plates 30 are located at opposite ends of the reel unit 20. Plates 30 are spanned at the top by a steel channel piece 32 and at the bottom by a rear roller (not shown) and a front roller 35. As shown in FIG. 2, the front roller 35 can be a so-called "Wiehle" roller, having a series of circumferential grooves across its entire width. Also spanning the end plates 30 is a horizontally centrally mounted rotatable reel 36 which is coupled to a hydraulic motor (not shown in FIG. 2). On the side opposite from the hydraulic motor is a counterweight 38, the purpose of which is to provide a counterbalancing force as against the hydraulic motor (not shown in FIG. 2; a hydraulic motor 39 is shown on the right side of the right front cutting unit in FIG. 1), to maintain a consistent turf pressure across the entire width of the cutting unit and to minimize "yaw" and "roll" of the cutting unit during transport to keep the cutting unit in a substantially level orientation. Thus, reel unit 20 is a substantially self-supporting unit which is pulled across the ground on rollers, the cutting blade of which is powered through a hydraulic connection with the traction vehicle 12. A bedknife (not shown) also spans between end plates 30 and is situated proximate the lower outer periphery of reel 36 so that when reel 36 spins its blades come into close proximity to the bedknife to shear the grass blades.

Figure 3:
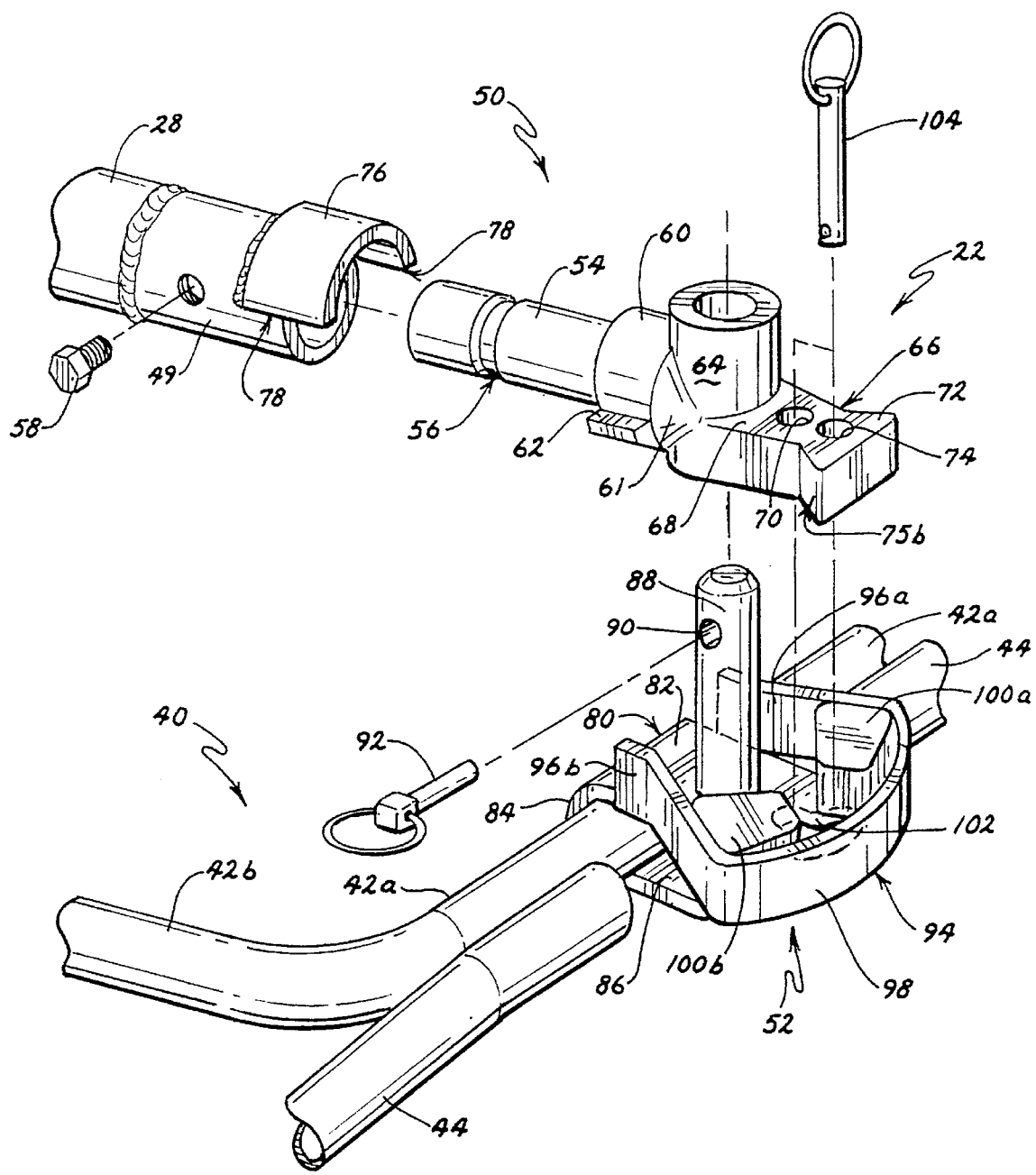
FIG. 3 is an exploded perspective view of the steering cutting unit joint illustrated in FIG. 2.

Referring to FIGS. 2 and 3 (an exploded view of cutting unit joint 22), cutting unit 20 is suspended from a carrier frame 40 consisting of a rearwardly opening U-shaped rear frame element 42 and a pair of laterally extending, generally straight, forward frame elements 44. Frame elements 42 and 44, made from steel tubing formed and welded in conventional manner, generally lie in a plane which is just below the longitudinal portions 28 of lift arms 18. Forward frame elements 44 are located on either side of cutting unit joint 22. Each forward frame element 44 includes a fixed end welded to the forwardmost leg of the "U" of rear frame element 42; and a free end located generally above the corresponding side plate 30. Referring to FIG. 3 in particular, rear frame element 42 has a forwardmost leg 42a in effect extending laterally through cutting unit joint 22, and a pair of rearwardly extending legs 42b generally perpendicular to leg 42a which extend longitudinally and which terminate toward the rear of the cutting unit 20, having laterally outward extensions 42c at the rear to position the rearward ends of frame element 42 generally over the rear portion of the corresponding side frame 30. Extending downwardly and pivotally from carrier frame 40 is a pair of forward links 46 and a pair of rearward links 48. Links 46 and 48 are pivotally attached to the side plates 30 and carrier frame 40. Carrier frame 40 and pivotal links 46 and 48 collectively comprise a four-bar linkage which produces a "virtual" pull point in a location depending on the "focal point" of links 46 and 48. The specifics of this four-bar linkage are described in co-pending patent application entitled "METHOD AND APPARATUS FOR SUPPORTING A TURF MOWER CUTTING UNIT," filed on even date herewith, assigned to the assignee herein, and incorporated herein by reference.

It should be noted that cutting unit joint 22 can be used virtually with any turf maintenance operating unit or turf maintenance operating unit carrier frame system, and the present invention is certainly not limited to the four-bar linkage described and shown herein. For example, steering cutting unit joint 22 could even be used with a simple rigid carrier frame, wherein there are no pivoting links analogous to links 46 and 48 shown in FIG. 2. Or, for that matter, it could be used with an operating unit having no carrier frame whatsoever.

It should also be noted that the term "cutting unit joint" is used herein to refer to a lift arm/cutting unit joint which at least provides for yawing or steering of the turf maintenance operating unit relative to the lift arm. A given "cutting unit joint" could provide for additional degrees of freedom (e.g., rolling and/or pitching or even vertical or horizontal translation) and incorporate the steering cutting unit joint of the present invention. In the embodiments described herein the cutting unit joint of the present invention is interposed between a lift arm and a carrier frame, but the present invention is not limited to this configuration.

Still referring to FIGS. 2 and 3, the longitudinal portion 28 of lift arm 18 carries a short, steel, tubular pivot hub 49 at its forwardmost or free end. Pivot hub 49 is sized and configured to receive a machined cast iron pivot knuckle 50 which roughly constitutes one-half of cutting unit joint 22. The other half, roughly speaking, of cutting unit joint 22, a knuckle snout receiver assembly 52, is rigidly connected to a central portion of rear frame element portion 42a. Pivot knuckle 50, preferably a machined steel part, includes a rearwardly extending cylindrical stud member 54 which rotatably fits within the tubular pivot hub 49. Stud member 54 carries a circumferential groove 56 toward its midpoint or slightly to the rear thereof. Groove 56 is sized to slideably accept the inner end of a retainer screw 58 which threads through a hole in the side of pivot hub 49. Retainer screw 58 simply prevents the pivot knuckle 50 from falling out of engagement with lift arm longitudinal portion 28, and retainer screw 58 does not bear down on or in any way restrict the free turning or "rolling" of pivot knuckle 50.

Further describing pivot knuckle 50, connected to and extending forwardly from cylindrical stud member 54 is a substantially cylindrical roll stop member 60 which is axially aligned with stud member 54 and which carries a pair of upwardly facing roll stops 62 on either side thereof, the function of which will be discussed below. The diameter of roll stop member 60 is preferably larger than the diameter of stud member 54. Roll stops 62 are diametrally located, generally speaking, on roll stop member 60, and can be contained in a horizontal plane when pivot knuckle 50 is in its normal, zero roll position.

Positioned forwardly of and rigidly connected to roll stop member 60 is a forwardly tapering transition section 61 which in turn is connected to a cylindrical steering bushing 64. Steering bushing 64 is in the nature of a hollow, circular cylinder, the axis of which is generally vertical (when pivot knuckle is in the zero roll position) and which is arranged substantially perpendicular to the longitudinal axis passing through stud member 54 and roll stop member 60.

Figure 7:
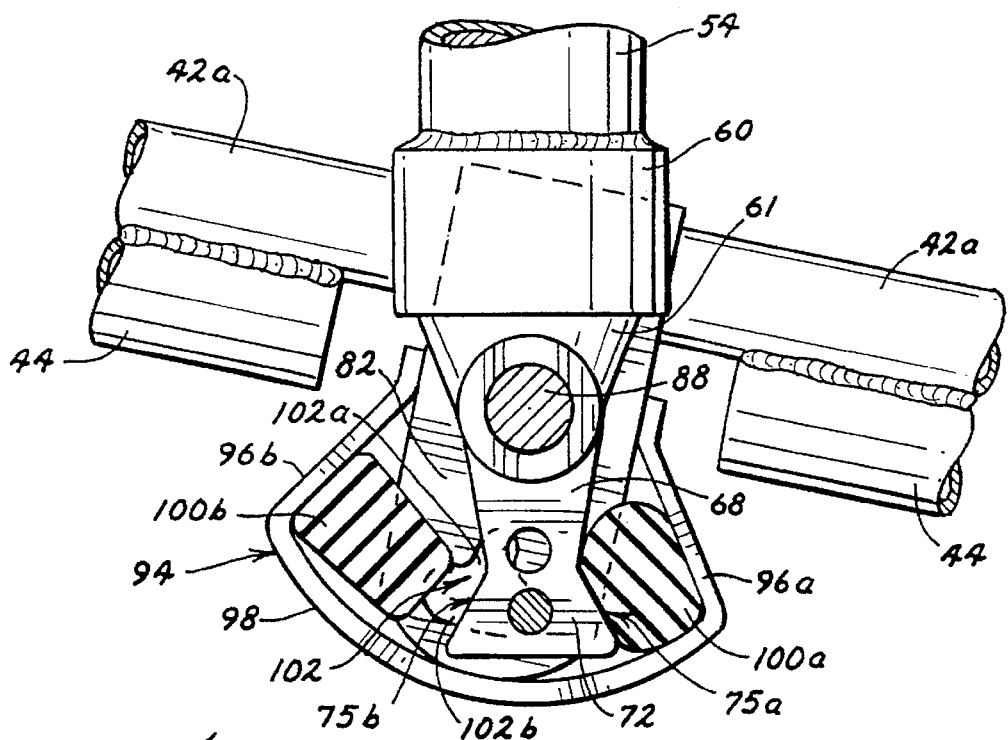
FIG. 7 is an enlarged top plan view of the steering cutting unit joint of FIG. 2, with the cutting unit yawed about 15 degrees from the normal position.

Extending forwardly from steering bushing 64 is a knuckle snout 66. Snout 66 is an hourglass-shaped element which includes a linearly converging section 68 which forms a first round, vertical aperture 70; followed by a slightly shorter linearly diverging section 72 forming another round, generally vertical aperture 74 having the same size as aperture 70. A top plan view of steering cutting unit joint 22 is shown in FIG. 7, for example. In plan, it is readily apparent how the converging section 68 of snout 66 starts out having a width equal to the outer diameter of steering bushing 64. As the converging section 68 extends forwardly from steering bushing 64, this portion of snout 66 tapers or converges in a linear fashion to form a neck at the narrowest portion of the snout 66, with the neck of snout 66 roughly located midway between apertures 70 and 74. The plan view of FIG. 7 also shows quite clearly how the diverging portion 72 of snout 66 is initially relatively narrow starting at the neck, and tapers outwardly in linear fashion until the width of snout 66 at its forwardmost extent is about equal to or slightly greater than the width of snout 66 at its base (i.e., at the connection point with steering bushing 64).

Snout 66 is preferably rectangular when viewed from the front or side. The vertical sides of snout diverging portion 72 (that is, vertical when the pivot knuckle 50 is in a zero roll position) are designated 75a and 75b in the drawings. The angle between sides 75 and a vertical plane passing through the longitudinal centerline of pivot knuckle 50 is preferably about 25 or 30 degrees.

Mounted on the forwardmost end of pivot hub 49 is a semicircular hood-like roll stop element 76. Element 76 is in effect one-half of a short tubular element which has been welded on the end of pivot hub 49, with element 76 facing downwardly and forming a pair of downwardly-facing roll stops 78 which are sized and configured to alternately engage either of the upwardly facing roll stops 62 on roll stop member 60. The function provided by the engagement of roll stops 62 and 78 is to provide limited "rolling" of pivot knuckle 50 relative to lift arm 18. In the preferred embodiment, pivot knuckle 50 can "roll" or twist about 18°–20° before it is stopped from further twisting or rolling by one of the upwardly facing roll stops 62 striking one of the downwardly facing roll stops 78. Rolling or twisting of pivot knuckle 50 ultimately results in rolling or twisting of the entire cutting unit 20. This permits the cutting unit 20 to individually follow the subtle undulations of the turf, at least those undulations which induce or require rolling of the cutting units.

As mentioned above, the other half, roughly speaking, of steering cutting unit joint 22 is the knuckle snout receiver assembly 52 rigidly connected to carrier frame 40. A "U" shaped steering axle support element 80 is connected to the rear frame element portion 42a by means of, for example, welding. Element 80 has a substantially horizontal and generally planar upper plate 82; a curved portion 84 extending around and behind rear frame element 42; and a lower substantially planar and horizontal plate 86 located beneath upper plate 82.

Extending upwardly from upper plate 82, and connected rigidly thereto, is a cylindrical steering axle 88, which also extends downwardly from upper plate 82 for securing to lower plate 86. Steering axle 88 is centered side-to-side on upper plate 82 and is located just forwardly of the leading edge of rear frame element portion 42a. Located toward the top of steering axle 88 is a laterally extending circular aperture 90 for receiving a retaining pin 92, the function of which will be described below.

Figure 5:
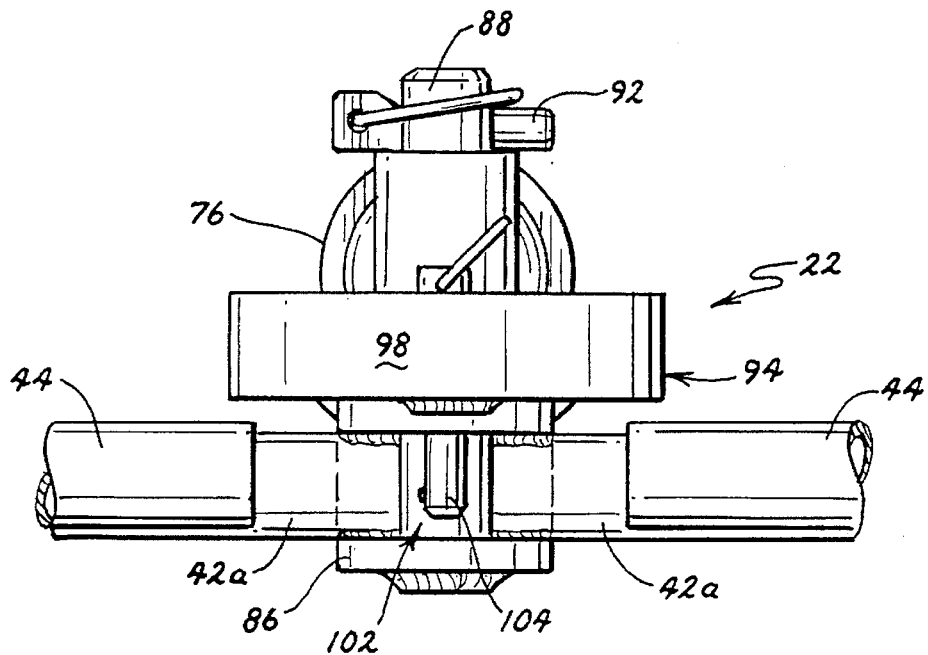
FIG. 5 is an enlarged front elevational view of the steering cutting unit joint of FIG. 2.

Connected to the side edges of upper plate 82 is a substantially U-shaped knuckle snout receiver 94. While steering axle support element 80 is a U-shaped element which opens forwardly and which has an axis extending laterally, snout receiver 94 is a U-shaped element which opens rearwardly and which has in effect a vertical axis. Knuckle snout receiver 94 is fabricated from strap steel and is welded to the outer top edges of upper plate 82. The rearmost end of snout receiver 94 has a width equal to that of steering axle support element 80. Snout receiver 94 tapers outwardly, becoming wider, as it extends forwardly. The straight sides 96 of snout receiver 94 end slightly forwardly of the carrier frame 40, and are interconnected by a curved portion 98. As shown in FIG. 5, snout receiver 94 in effect rests on top of upper plate 82 in the sense that the lowermost edge of snout receiver 94 is substantially in the same plane as the top surface of upper plate 82.

Referring to FIG. 3, the side portions 96 of knuckle snout receiver 94 each carry, on their inwardly facing surfaces, a resilient element 100. While any resilient or elastic component or system could be used, in the preferred embodiment tapered plugs or wedge-like elements are used, with the base of each element secured to the corresponding side portion 96. Resilient elements 100 taper toward the longitudinal centerline of upper plate 82. Each resilient element is in the nature of a truncated isosceles triangle having a uniform thickness dictated by generally vertical side walls, the base of which is secured to a snout receiver side portion 96. An imaginary vertical plane passing through the element, and about which the element is symmetrical, is perpendicular to side portion 96. In a preferred embodiment, the base is 1.40 inches wide, the free height or length of the element is about 1.56 inches, and the thickness of the element is about 1 inch. The elements 100 can be made using standard extrusion techniques. Each element 100 is preferably made of neoprene and is secured to the side portion 96 using an acrylic adhesive or other industrial adhesive. The preferred durometer of the neoprene is 55 on the A scale, and the elements are sized and configured to produce about 50 pounds of yaw resisting force with 0.20 inch deflection; about 100 pounds at 0.30 inch deflection; and about 135 pounds at 0.40 inch deflection. The effective "spring rate" of elements 100 is non-linear in the sense that a plot of force versus deflection is non-linear. This is intentional and attributable in large part to the pyramid or wedge shape of elements 100.

Upper plate 82 forms a steering pin aperture 102 somewhat triangular in shape, having three "lobes," which includes a rear lobe or aperture portion 102a having a width about equal to the diameter of snout apertures 70 and 74; and a forward portion 102b, comprising the two forward lobes, having a width roughly three times the width of the rear aperture portion. The function of aperture 102 will be further described below.

The last component of the steering cutting unit joint 22 of the present invention is a steering pin 104 which can be slideably received by snout aperture 70 or 74, and also slideably received by steering pin aperture 102, as further discussed below.

Figure 6:
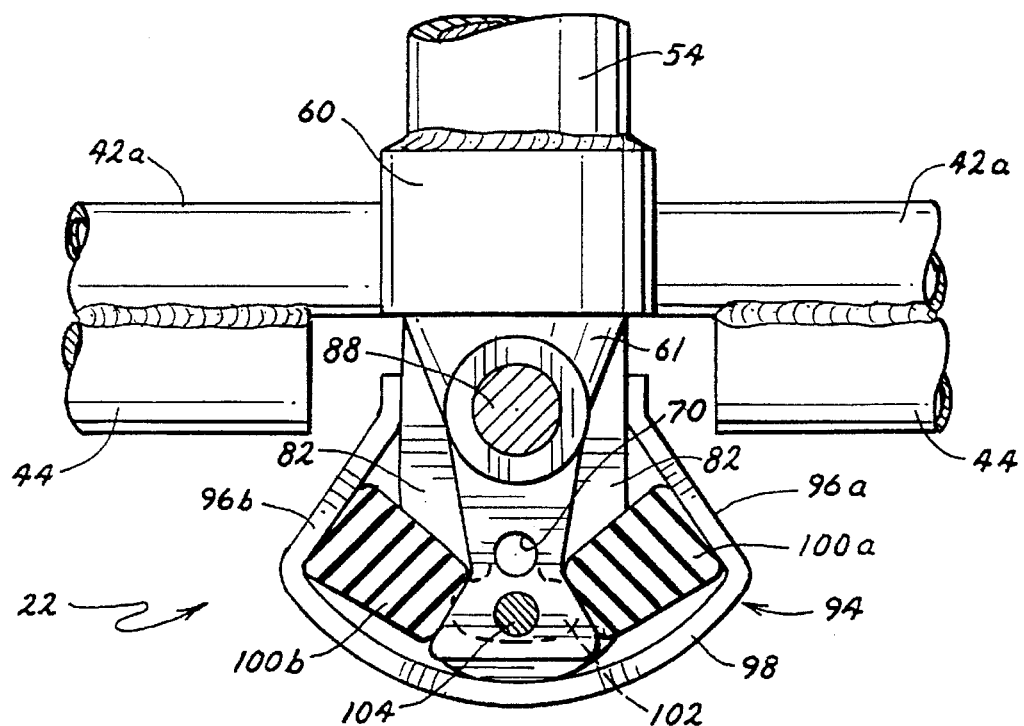
FIG. 6 is an enlarged top plan view of the steering cutting unit joint of FIG. 2, with the cutting unit in its neutral or normal operating position.

FIGS. 5, 6 and 7 show the steering cutting unit joint of the present invention in its assembled state. As shown, steering axle 88 is rotatably received by steering bushing 64 and these two components are axially constrained, such that the cutting unit does not simply fall away from lift arm 18 when the lift arm is raised, by retaining pin 92. Snout 66 fits within snout receiver 94 as shown in FIGS. 6 and 7, such that elastomeric elements 100 can bear on the sides 75 of snout forward portion 72. Steering pin 104 completes the assembly when inserted into either snout aperture 70 or 74. When steering pin 104 is placed in rear aperture 70, it then extends through the rear portion 102a of steering pin aperture 102, and this prevents steering of the cutting unit. In some situations, namely operating on somewhat steep side hills, it is desirable to prevent steering. Although steering is generally preferred for mowing, those skilled in the art recognize that it is occasionally preferred to prevent any steering whatsoever of the operating units relative to their respective lift arms.

When steering pin 104 is inserted into forward aperture 74, on the other hand, limited steering is permitted. In the preferred embodiment, the width of steering pin aperture portion 102b is such that cutting unit 20 can yaw or steer about 15° in either direction, for a total possible yaw angle of about 30°. As in the case of the "rolling" function occasioned by the interaction of roll stops 62 and 78, the yawing or steering function permits better tracking of the cutting units so that they do not skid through turns and instead the cutting unit is permitted to function in the nature of a caster wheel, so that the rollers of the cutting unit are always in fact rolling rather than skidding across the turf.

FIGS. 6 and 7 show the steering pin 104 in its forward position, i.e., in snout aperture 74, permitting yawing or steering of the cutting unit. The innermost tips of resilient elements 100 can bear on the sides 75 of the diverging portion 72 of snout 66. When steering or yawing of the cutting unit takes place, as shown in FIG. 7, then the resilient element 100 on the side opposite from the direction in which the cutting unit is turning simply compresses, and the steering or yawing motion is not materially hindered. The bulk modulus of elasticity or the spring rate of the resilient elements 100 is not at all sufficient, in the preferred embodiment, to hinder the cutting unit from steering as needed when it is in its operating position. The resilient elements 100 can reduce vibration or rattling of the cutting units 20 as they traverse a turn, but this is not the central focus of the invention. The extent of the steer or yaw is normally determined by the steering pin 104 engaging the outer lateral edge of the forward wide portion of steering pin aperture 102. Usually it is not necessary for the cutting unit to steer or yaw beyond about 15° in either direction, and therefore the ±15° maximum yaw provided by aperture 102 is normally sufficient.

The overall shape, in plan view, of snout receiver 94 can now be understood. Referring to FIGS. 6 and 7, the side portions 96 are angled to be generally parallel with the angle of walls 75 in the diverging portion 72 of snout 66. Thus, resilient elements 100 are placed, as much as possible, in pure compression and are not sheared to any great extent. This is helpful in terms of retaining resilient elements 100, i.e., not requiring the adhesive to absorb much in the way of shear load. The forward curved wall 98 of snout receiver 94 can now be seen to have a radius sufficient to clear the forwardmost tip of snout 66. Snout 66 can freely swing back and forth within snout receiver 94, and the forward end 98 of snout 66 does not scrape against the inner face of curved portion 98 of snout receiver 94. In fact, the center of curvature of end 98 would preferably be located at the center of steering axle 88.

Figure 4A:
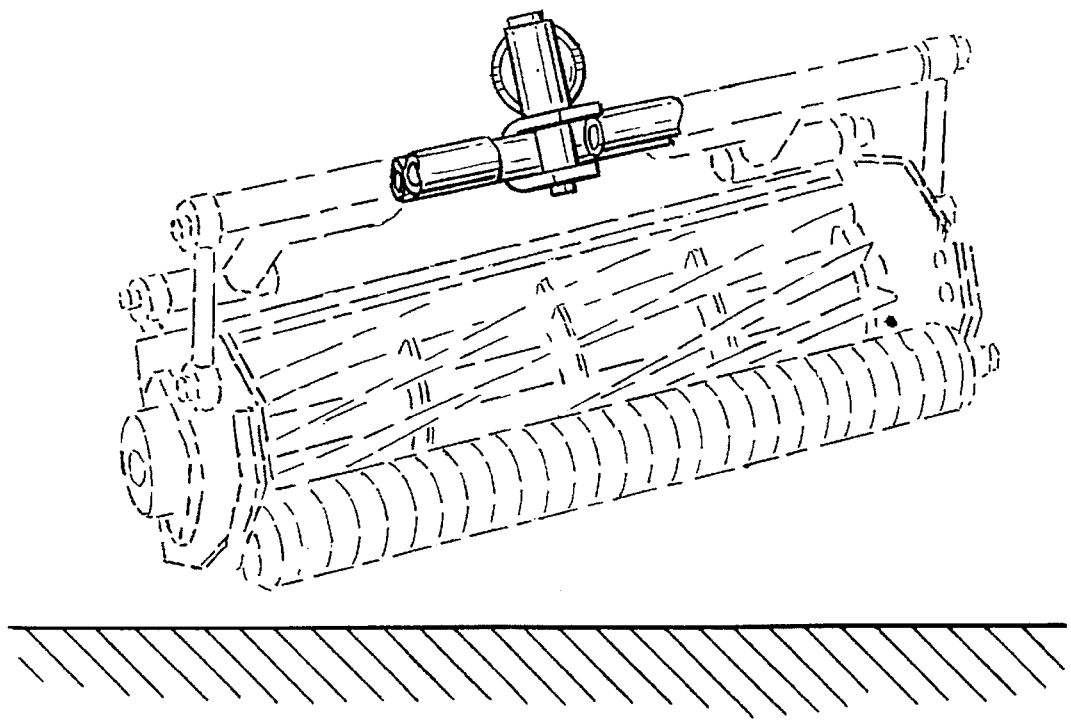
FIG. 4A is a front elevational view of a reel-type cutting unit supported by a steering joint of a type generally reflective of the prior art, with the reel being in a tipped, transport position.
Figure 4B:
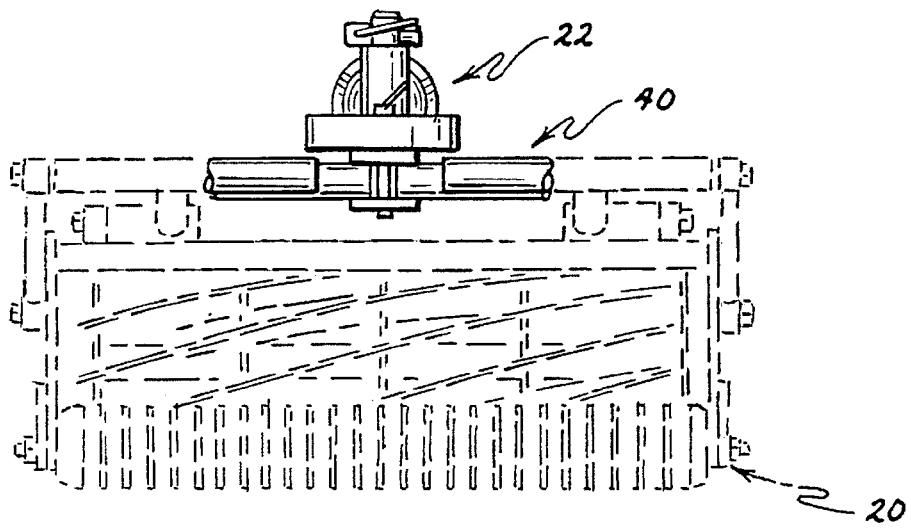
FIG. 4B is a front elevational view of a reel-type cutting unit supported by the steering cutting unit joint of FIG. 2, with the reel in a straight and level transport position.

The primary function of resilient elements 100 is to urge the cutting unit 20 into a normal, longitudinally aligned position when the cutting unit is in its raised, transport position. Referring to FIGS. 6 and 7, when the cutting unit 20 is raised off of the turf, and if it is yawed to one side or the other, the appropriate resilient element 100 will compressively bear on the corresponding side wall 75 of snout 66 as well as the inner surface of the corresponding wall 96 of snout receiver 94. This urges the cutting unit toward a "normal" position, e.g., wherein a vertical plane containing the rotating axis of the reel is substantially perpendicular to the longitudinal portion of the corresponding lift arm. Put simply, the cutting unit is preferably made "straight," and the yaw of the cutting unit is substantially eliminated. The rationale behind this operation is reflected in FIGS. 4A and 4B. FIG. 4A shows a prior art reel which does not include the cutting unit joint of the present invention. In this case, the cutting unit has yawed to one side which has shifted the center of gravity of the reel to the same side, and this in turn causes the reel to "roll" to one side. The cutting unit will tend to stay in this tipped position until it is lowered to the turf, typically "on the fly." This causes the lowermost corner of the cutting unit to gouge the turf. In contrast, the cutting unit of FIG. 4B, using the steering cutting unit joint 22 of the present invention, is not yawed over to one side, and therefore the center of gravity does not shift to roll or tip the cutting unit to one side, and therefore the cutting unit remains straight and level during transport and does not gouge or scuff the turf when the cutting unit is lowered to its operating position. Since the cutting unit is preferably well balanced, and includes necessary counterweighting (e.g., to offset the weight of the hydraulic motor), the cutting unit will not tend to "roll" over during transport unless preceded by a yawing action of the cutting unit. Thus, when yaw of the cutting unit is eliminated or prevented by means of resilient elements 100, then unit 20 will not tend to roll to one side or the other when in its transport position. Thus, "on the fly" cutting unit transitions can be made without gouging the turf. The modulus of elasticity or spring rate of resilient elements 100 is sufficient to straighten the cutting unit (i.e., to eliminate yaw) only when the cutting unit is raised off of the turf. That is, the moment created by the resilient elements 100, ultimately on cutting units 20, is not sufficient to materially interfere with normal steering when the cutting units are in engagement with the turf, but the moment created by the resilient elements is indeed sufficient to straighten the cutting unit, to eliminate yaw, when the cutting unit is lifted off of the turf. During transport, cutting unit 20 is maintained in a straight and level orientation so that the turf is not gouged when the cutting unit 20 is lowered to its operating position "on the fly."

Resilient elements 100 are preferably edge-shaped (i.e., becoming wider as the distance from the snout increases) in order to achieve a non-linear increase in "straightening" force as the resilient element is compressed. That is, the spring force created by the affected resilient element 100 will dramatically increase as the yawing approaches the end of its potential travel, as determined by engagement of steering pin 104 with the outer edge of aperture portion 102b. By doing this, the steering pin/steering pin aperture impact is significantly reduced if not eliminated, thus reducing vibration, wear and noise.

Figure 8:
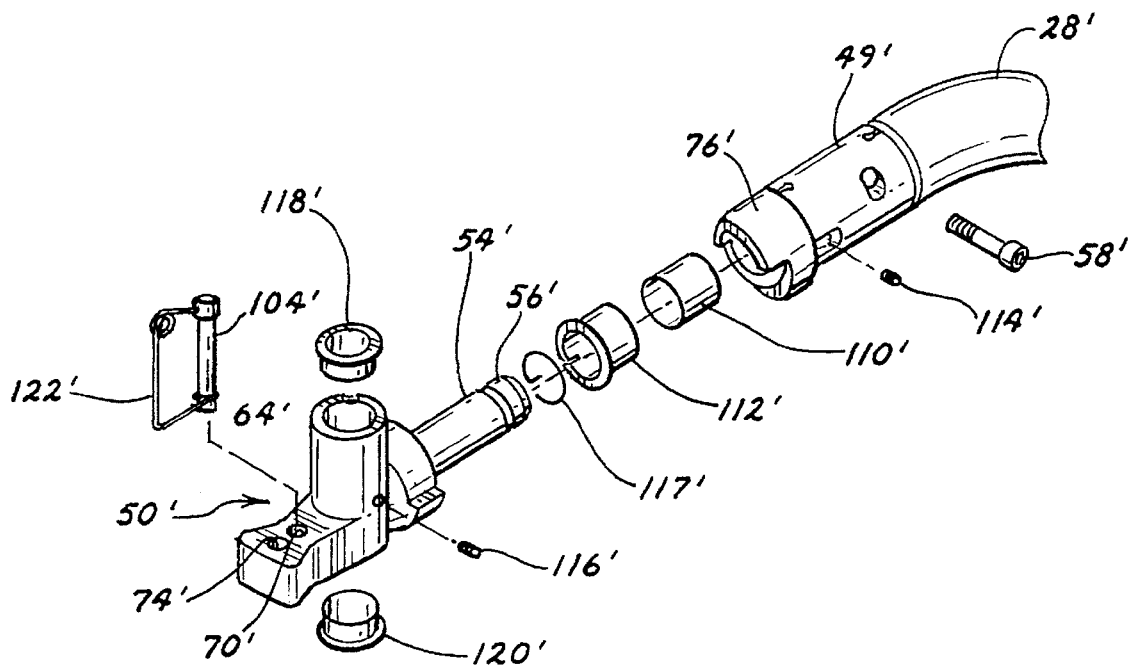
FIG. 8 is an exploded perspective view of an alternative pivot knuckle and related components.

FIG. 8 shows an exploded perspective view of an alternative embodiment of the pivot knuckle and related components. "Primes" will be used to refer to components in this second embodiment, and to the extent that these second embodiment components are similar to components in the first embodiment described above in some detail, the same base numbers will be employed. In this second embodiment, the circumferential groove 56' used to retain the pivot knuckle 50' within the pivot hub 49' is located at the rearmost end of stud member 54'. This embodiment also illustrates the use of a straight bushing 110' and flange bushing 112' to assist in smoothly, rotatably supporting pivot knuckle 50' within pivot hub 49'. FIG. 8 also illustrates a grease fitting 114' in pivot hub 49', whereby the pivot hub/pivot knuckle assembly can be lubricated; a grease fitting 116' in pivot knuckle 50', whereby the steering joint can be lubricated; and an O-ring 117' designed to help retain lubricant in the "roll" joint. FIG. 8 also illustrates top and bottom flange bushings 118' and 120', respectively, which can be inserted into the top and bottom of pivot knuckle portion 64'. Finally, FIG. 8 illustrates a steering pin 104' which includes a removable retainer spring 122' in the nature of a U-shaped wire spring, the top end of which is fixed to the top end of pin 104' and the bottom end of which is coiled to receive the bottom of steering pin 104'. When it is desirable to change the steering "mode" from "steering prohibited" to "steering permitted," or vice versa, spring 122' is released at the bottom thereof so that pin 104' can be removed from either snout aperture 70' or 74' and reinserted into the other snout aperture.

It should be noted that the first embodiment of the pivot knuckle 50 and related components also preferably contains various bushings, O-rings and grease fittings. The need for and implementation of components such as these are well known by those skilled in the art.

It should also be noted that retainer screw 58', in the second embodiment, threads into a hole in pivot hub 49' which is located above the centerline of hub 49'. Set screws, retainer screws and the like are well understood by those skilled in the art.

Preferred embodiments of the invention are described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereto.

We claim:

1. A turf maintenance machine comprising:
   (a) a traction unit;
   (b) a lift arm operatively connected to the traction unit;
   (c) a turf maintenance operating unit; and
   (d) a steering operating unit joint connecting the turf maintenance operating unit to the lift arm, wherein the turf maintenance operating unit has an operating position and a transport position, and wherein the steering operating unit joint (i) permits the turf maintenance operating unit to yaw from a generally straight orientation to a generally yawed orientation, and (ii) includes a resilient component which exerts on the turf maintenance operating unit a yaw resisting force sufficient to move the turf maintenance operating unit from its generally yawed orientation to its generally straight orientation when the turf maintenance operating unit is in its transport position.

2. The turf maintenance machine of claim 1, wherein the lift arm comprises a first end pivotally connected to the traction vehicle and a second end which carries the steering operating unit joint.

3. The turf maintenance machine of claim 2, wherein the lift arm comprises a lateral portion proximate the first end thereof and a longitudinal portion proximate the second end thereof.

4. The turf maintenance machine of claim 3, wherein the steering operating unit joint comprises (i) a snout connected to and extending forwardly of the lift arm longitudinal portion, and (ii) a snout receiver connected to the turf maintenance operating unit and opening rearwardly to receive the snout, wherein the resilient component is located between and urges against the snout and the snout receiver.

5. The turf maintenance machine of claim 4, wherein the resilient component comprises a first resilient element bearing against a first side of the snout and a second resilient element bearing against a second side of the snout.

6. The turf maintenance machine of claim 5, wherein each resilient element comprises a generally triangularly shaped piece of elastomeric material, and wherein each resilient element comprises a base.

7. The turf maintenance machine of claim 6, wherein (i) the snout receiver has a first side proximate the snout first side and a second side proximate the snout second side; (ii) the first resilient element is disposed between the snout first side and the snout receiver first side; (iii) the second resilient element is disposed between the snout second side and the snout receiver second side; and (iv) each elastomeric element is oriented such that the base of the elastomeric element is secured to its corresponding snout receiver side and extends toward its corresponding snout side.

8. The turf maintenance machine of claim 2, wherein the steering operating unit joint comprises a first element and a second element for receiving the first element, wherein the resilient component is positioned between the first element and the second element.

9. The turf maintenance machine of claim 8, wherein the first joint element is connected to the second end of the lift arm, and wherein the second joint element is connected to the turf maintenance operating unit.

10. The turf maintenance machine of claim 1, wherein the turf maintenance operating unit is a mowing unit.

11. The turf maintenance machine of claim 10, wherein the mowing unit is a reel cutting unit.

12. The turf maintenance machine of claim 1, wherein the turf maintenance machine is a turf mower comprising a plurality of reel cutting units, a corresponding plurality of lift arms, and a corresponding plurality of steering cutting unit joints, each reel cutting unit having associated therewith one of the lift arms and one of the steering cutting unit joints.

13. The turf maintenance machine of claim 12, wherein each steering cutting unit joint also permits rolling of the corresponding cutting unit relative to its lift arm.

14. The turf maintenance machine of claim 1, wherein (i) the resilient component produces a yaw resisting force on the turf maintenance operating unit; (ii) the yaw resisting force is insufficient to materially hinder yawing of the turf maintenance operating unit when it is in its operating position; and (iii) the yaw resisting force causes the turf maintenance operating unit to return to its normal position once the turf maintenance operating unit is raised to its transport position.

15. The turf maintenance machine of claim 8, further comprising a steering pin, wherein: (i) the first element forms a pair of top steering pin apertures having a size conforming closely to the steering pin; (ii) the second element forms a bottom steering pin aperture having a first portion roughly equal in lateral dimension to the top steering pin apertures, and a second portion having a lateral dimension of considerably larger size; and (iii) the steering pin engages either the rear top aperture and the first portion of the bottom steering pin aperture, to prevent yawing of the turf maintenance operating unit, or engages the front top aperture and the second portion of the bottom aperture, to permit yawing of the turf maintenance operating unit.

16. The turf maintenance machine of claim 6, wherein the elastomeric material is neoprene.

17. The turf maintenance machine of claim 1, wherein the resilient component provides a nonlinear yaw resisting force which urges the turf maintenance operating unit toward a predetermined normal position.

18. The turf maintenance machine of claim 1, wherein the resilient component has a spring rate in the range of about 250 pounds per inch to 337.5 pounds per inch.

19. The turf maintenance machine of claim 17, wherein the resilient component comprises a pair of elastomeric elements, wherein only one of the elastomeric elements is being appreciably deflected in response to yawing of the operating unit at any given time, and wherein each elastomeric element provides a yaw resisting force at a rate of about 250 pounds per inch to 337.5 pounds per inch, depending on the amount of deflection of the affected elastomeric element.

20. The turf maintenance machine of claim 7, wherein each snout side is generally parallel to the corresponding snout receiver side, whereby each resilient element is sandwiched between the two substantially parallel associated sides and is compressed therebetween when the operating unit yaws.

21. A reel-type turf mower comprising:
  (a) a traction unit having a frame;
  (b) a plurality of reel-type cutting units; and
  (c) a corresponding plurality of lift arms, wherein
    (i) each lift arm is pivotally connected to the frame of the traction unit;
    (ii) the turf mower further comprises a steering knuckle joint between and connecting each reel-type cutting unit and the corresponding lift arm; and
    (iii) each steering knuckle joint comprises a snout connected to the lift arm, and a snout receiver connected to the corresponding reel-type cutting unit; and the turf mower further comprises an elastic component located between and urging against each snout and corresponding snout receiver, whereby the steering knuckle joint permits the associated cutting unit to yaw from a generally straight orientation to a generally yawed orientation, and the elastic component exerts a yaw resisting force between the snout and the snout receiver sufficient to move the cutting unit from its generally yawed orientation to its generally straight orientation when the cutting unit is in its transport position.

22. A turf maintenance machine comprising:
(a) a traction unit;
(b) a connection element operatively connected to the traction unit;
(c) a turf maintenance operating unit; and
(d) a steering operating unit joint connecting the turf maintenance operating unit to the connection element, wherein the turf maintenance operating unit has an operating position and a transport position, and wherein the steering operating unit joint (i) permits the turf maintenance operating unit to yaw relative to the traction unit, and (ii) includes a resilient component which generally straightens the turf maintenance operating unit relative to the traction unit when the turf maintenance operating unit is in its transport position, but which does not appreciably interfere with normal steering of the turf maintenance operating unit when the turf maintenance operating unit is in its operating position.

23. A reel-type turf mower comprising:
(a) a traction unit having a frame;
(b) a plurality of reel-type cutting units; and
(c) a corresponding plurality of connection elements for connecting the cutting units and the traction unit, wherein
(i) each connection element is connected to the frame of the traction unit;
(ii) the turf mower further comprises a steering knuckle joint between and connecting each reel-type cutting unit and the corresponding connection element; and
(iii) each steering knuckle joint comprises a snout connected to the corresponding connection element, and a snout receiver connected to the corresponding reel-type cutting unit; and the turf mower further comprises an elastic component located between and urging against each snout and corresponding snout receiver, whereby the steering knuckle joint permits the associated cutting unit to yaw from a generally straight orientation to a generally yawed orientation, and the elastic component exerts a yaw resisting force between the snout and the snout receiver sufficient to move the cutting unit from its generally yawed orientation to its generally straight orientation when the cutting unit is in its transport position whereby the elastic component generally straightens the cutting unit relative to the connection element when the cutting unit is in its transport position.

* * * * *